United States Patent [19]

Kirkpatrick et al.

[11] Patent Number: 5,387,283
[45] Date of Patent: Feb. 7, 1995

[54] PROCESS FOR PRODUCING A HYDRAULIC CEMENT BINDER FOR BOTH GENERAL AND SPECIAL APPLICATIONS

[76] Inventors: William D. Kirkpatrick; Carole W. Kirkpatrick, both of 1431 S. Ocean Blvd., #10, Pompano Beach, Fla. 33062

[21] Appl. No.: 267,590

[22] Filed: Jun. 29, 1994

Related U.S. Application Data

[63] Continuation of Ser. No. 66,702, May 27, 1993.

[51] Int. Cl.$^6$ ............................................. C04B 14/04
[52] U.S. Cl. ................................... 106/709; 106/705; 106/714; 106/717; 106/737; 106/738; 106/815; 106/817; 106/819; 106/DIG. 1; 264/DIG. 49
[58] Field of Search ............... 106/705, 709, 717, 719, 106/737, 815, 817, 819, DIG. 1, DIG. 49, 714, 738

[56] References Cited

U.S. PATENT DOCUMENTS

| | | | |
|---|---|---|---|
| 4,131,578 | 12/1978 | Crinkelmeyer et al. | 106/717 |
| 4,306,912 | 12/1981 | Forss | 106/705 |
| 4,313,763 | 2/1982 | Turpin, Jr. | 106/DIG. 1 |
| 4,842,649 | 6/1989 | Heitzmann et al. | 106/89 |
| 4,997,484 | 3/1991 | Gravitt et al. | 106/708 |

*Primary Examiner*—Mark L. Bell
*Assistant Examiner*—Michael Marcheschi

[57] ABSTRACT

A process is disclosed for producing a hydraulic cement binder for both general and special applications, consisting of water, cementitious materials, boric acid, borax, citric acid, an alkali metal activator, and with or without ground silica. This cement making process with sequences for mixing the composition, is particularly useful because it provides: time to mix all components adequately, unrestricted transporting time that can be terminated, at will, followed by alterable placement and finishing times. The process provides the means for creating a hydraulic cement binder that can be used as a neat cement or it can be extended with fillers, such as sand and gravel, to make mortar or concrete, that rapidly gains very high structural strengths.

14 Claims, No Drawings

PROCESS FOR PRODUCING A HYDRAULIC CEMENT BINDER FOR BOTH GENERAL AND SPECIAL APPLICATIONS

CROSS REFERENCE TO RELATED APPLICATION

This application is a continuation of our co-pending application Ser. No. 08/066,702, filed May 27, 1993.

FIELD OF THE INVENTION

High early strength, blended hydraulic cements, mixed in and activated by water, to form neat cements, or extended with aggregates to make concrete and mortar, have become essential building materials for today's construction industry.

BACKGROUND OF THE INVENTION

The hydraulic cement industry has utilized, in cement formulations, various ashes which are essentially waste products or by-products of production processes for several desired goals, the most obvious of which is to utilize an ever-growing source of material while at the same time lessening the ecological burden. Prior art has continued this evolution to the point of development of cement binders made exclusively from ash materials, with little or no portland cement as a constituent. What has evolved are high early strength hydraulic cements that are used for limited special applications.

These mineral binders and their progeny, have been developed with emphasis on dry interground or interblended formulation which is then mixed in water to produce an activated binder. The problem of intergrinding or interblending presents itself in the form of increased cost because of the need to transport the raw materials for making the binder to a central location where the grinding and manufacturing can take place.

The formulations of these prior art binders present a number of difficulties and limitations to the user. In each, there is an inherent failing: the water which is introduced into the binder material is needed to serve the purpose of properly dissolving and dispersing each element of the composition so that it may interact with the balance of the elements; however, the hydration reaction which is the ultimate goal begins to occur at the moment the water is introduced. When the objective is to produce high early strength cements, the problem of mixing is compounded by the need to include accelerators, activators, and retarders. Not only does the hydration reaction begin with the addition of water, but the water is also what starts the accelerators, activators, and retarders to interact with one another, and, the cementitious components, thereby affecting how fast or how slow the hydration proceeds. This prior art method, with limited amount of time, presents difficulty when the binder is put to practical applications. The user has an ever-decreasing amount of time to mix, transport and place the material properly. Time is so short that on-site mixing becomes imperative and only special applications that can afford the extra cost involved can use these cements. Although recent developed cements have provided high early strengths, the loss of working time was an unfortunate consequence of what was accomplished. Such cements are described in Heitzmann et al., U.S. Pat. No. 4,842,649, issued Jun. 27, 1989, and Gravitt et al., U.S. Pat. No. 4,997,484, issued Mar. 5, 1991, respectively.

Further, these prior art cement binders exhibit a premature exothermic reaction during mixing as portions of the binder agglomerate or "ball". When these binders are used for making structural mortars and concretes on a large scale (such as in a ready-mix truck or an industrial batch operation), agglomeration or "bailing" could have disastrous effects upon the equipment unless the mixer is only partially filled. After mixing for a few minutes the reaction subsides and the mix smoothes out.

All of the prior art high early strength cements, stress the necessity of low water/cement ratio, which results in low slump, and is difficult to place. Another consequence of low water/cement ratio is inadequate bleed water for the finisher to trowel the mixture properly.

Also the cement binder as described in U.S. Pat. No. 4,997,484, does not appear to provide adequate abrasion resistance for structural applications.

What prior art has not recognized is the value which each element of the composition can impart when introduced individually. Many prior art compositions contain material elements which are somewhat mutually exclusive, and are referred to in the prior art as retarders and activators or accelerators. Logic would not dictate that efficient use of either could be obtained by activating both at the same moment. This is particularly significant since some of the material components referred to by the industry as retarders actually provide significant additional functional value, undiscovered in prior art.

Prior art describes the use of citric acid as a retarder. The confusion over what role citric acid actually plays is probably the reason why previous attempts to control the hydration reaction of cements containing large quantities of subbituminous fly ash have had such erratic results. In the field of high percentage fly ash binders which are formulated as high early strength hydraulic cements, citric acid can play a role more aligned with an accelerator. Prior art usage has failed to recognize this phenomenon and consequently, in some cases has attempted to utilize citric acid as a retarder where the formulation design could only cause the citric acid used to exhibit itself as an accelerator. Such cement binders are described in U.S. Pat. No. 4,997,484, respectively.

Prior art has also failed to provide for a composition of material which would allow the user to control the initial set of the material at the location of use. The consequence of this failing, when considered together with the very limited amount of working time provided by prior art binders, is that they may only be used in special applications on a small scale. Since high volume use requires machinery intensive production processes, users require materials with a greater degree of flexibility in order to minimize the risks associated with cement binders producing high early strength hardened masses.

The present invention addresses the need for a rapid strength gaining, hydraulic cement by providing a composition of materials which are introduced by mixing sequences to provide:

1. time to mix all the ingredients properly, 2. unrestricted time to transport the mixture of cementitious components, water and aggregates with the ability to terminate the time when it is not needed, 3. high early strength cements with high slump mixes that are easy to place and finish, and, 4. placement and finishing time period that can be short or long depending on the applications, with the added flexibility, to make a selection at the job site.

A further method of this invention is to improve the physical properties of waste fly ash so they can be used more productively to create both general purpose as well as special application blended hydraulic cements by:

1. removing unburnt carbon, if it prevents the use of fly ash that contains excessive amounts,
2. improving the density to reduce the permeability, and,
3. increasing the abrasion resistance.

Prior art teaches away from the present invention when U.S. Pat. No. 4,842,649, states the order of mixing the various materials that make up the composition is immaterial, and, U.S. Pat. No. 4,997,484, states that all the components can be interground or interblended and that doing so eliminates the control problems that can occur.

BRIEF DESCRIPTION OF THE INVENTION

The following components are used to make the blended hydraulic cement of the present invention for both general and special applications. The approximate amounts are:

(A) About 14.52 to 21.77 percent Water
(B) About 0.10 to 1.35 percent Boric acid
(C) About 0.20 to 2.95 percent Borax
(D) About 50.33 to 83.36 percent Subbituminous fly ash
(E) About 0 to 8.00 percent Type III portland cement
(F) About 0 to 16.00 percent Type I portland cement
(G) About 0 to 8.00 percent Slag cement
(H) About 0.30 to 11.05 percent Alkali metal activator
(I) About 0.25 to 2.85 percent Citric acid
(J) About 0 to 8.00 percent Ground silica Pre-established amounts of the chemicals and minerals are optimized to provide the highest possible early strengths.

The method for making this blended hydraulic cement begins by dissolving in water, component (B) or component (C), or (B) and (C) together. Whichever material component is used, it is used in sufficient quantity to prevent, as opposed to merely retard, the hydration of the components (D), (E), (F) or (G). Alternately, components (B) through (G) with or without component (J) and/or other aggregates can first be combined, then component (A) added, however doing so would require a slight increase in (B) and/or (C).

If desired, inert aggregates, and other inert materials, such as component (J), may or may not be added at this time. Depending on the amount of components (B), (C), or (B) and (C) used, the partially made cement, with or without aggregate fillers, can be suspended/transported for minutes, hours, or several consecutive days. The suspension process can be terminated, at will, and the cement making process can be continued by adding the component (B), (if it was not previously added). Adding component (B) at this point in the mixing sequence, rather than dissolving it with the component (C) in water, extends the placement time. The next order of mixing is to add either the component (H) or the component (I) that acts like an accelerator in the present invention, as opposed to being a retarder in prior art. Provided the ratio of component (B) used is not greater than 33% of the combined components (B) and (C) used, adding the component (I) as the last component will cause the placement time to be longer. If the component (B) to component (C) ratio is as previously stated, adding (H) as the last component will shorten the placement time. Extremely long placement times can be obtained by the accumulative effect of adding the component (B) immediately before the component (H) and followed by the component (I). If component (B) is used by itself or the ratio of (B) to (C) is increased whereby (C) becomes the dominant component, the results obtained by the order of the last two components is reversed.

When the last chemical component is mixed and the cement is complete, sand to make mortar or sand and coarse aggregates to make concrete can be added at this time, if they were not added during the cement making process. The ability to add aggregates at two different times will provide added benefits to the users of neat cement, mortar, or concrete while continuing to maintain the same established methods of the past.

A significant feature of the present invention is that the ratio of chemicals to the cementitious components is established to achieve the highest possible strengths and durability. Once the formulation is optimized for the particular fly ash that is being used, the quantity of components are not altered to achieve longer or shorter working times. The variations in placement time, which follows the transport/suspension time period, is achieved in the present invention by changing the order of introduction of the chemicals not their amounts. In addition, the amount of placement times can be fine tuned by using different quantities of separate types of portland cement or slag cement. Those skilled in the art know that component (F) offers slower setting (placement) time than component (E). Component (G) in the present invention provides approximately the same amount of placement time as component (E). Therefore, when more of component (F) is used it would provide more placement time.

Those skilled in the art, will recognize that increasing the amount of portland cement or slag cement beyond the amount needed to provide abrasion resistance and less permeability will increase the cost in as much as the waste fly ash, which is responsible for providing the sulfate resistance, provides the same strength as the portland cement and slag cement for less cost. The large amount of fly ash used in the present invention helps offset the cost of the chemical components necessary to make the blended hydraulic cement of the present invention achieve high early and ultimate strengths with lasting durability.

In the present invention either the component (B) or component (C) can be eliminated, but not both. If there is no need to extend the placement time component (C) can be used without component (B) if it is mixed with warm water, or as long as it can be dissolved in the small amount of water being used. At times this may be preferred since (C) is more readily available in large quantities. One may prefer to use component (B) without component (C) because the small amount of water used is still sufficient for dissolving the amount of (B) that would normally be needed. Also the volume required is less than component (C). However, the cost of (B), per pound is higher than (C).

Prior art optimizes the amount of chemical components needed to provide the highest possible strengths, then alters the established amounts to provide longer or shorter working times. The present invention optimizes the chemical amounts needed to provide the highest strengths possible, but does not alter these amounts to provide more or less placement time.

Ten different sequences are necessary in the present invention to provide the flexibility to handle all types of applications. These can range from applications that require no transport time to those needing a week or more. Placement times may be as short as a few seconds or as long as several hours. In addition, the mixing sequence provides an option that can be exercised by those placing the material to choose from various placement time periods. These are provided by the order in which the last components are introduced. Because of the ten different mixing sequences, all the above can be accomplished with a rapid curing cement, without sacrificing very high early strengths, or very high ultimate strengths. The high early strength, blended hydraulic cement of the present invention can be used interchangeably as a general purpose cement, or a cement capable of performing under very special conditions requiring precise time periods.

DESCRIPTION OF THE PREFERRED EMBODIMENTS

The essential components of the present invention to produce the blended hydraulic cement for both general and special applications, by weight, per 100 percent total cement is as follows:

(A) About 14.52 to 21.77 percent Water
(B) About 0.10 to 1.35 percent Boric Acid
(C) About 0.20 to 2.95 percent Borax
(D) About 50.33 to 83.63 percent Subbituminous Fly Ash
(E) About 0 to 8.00 percent Type III Portland Cement
(F) About 0 to 16.00 percent Type I Portland Cement
(G) About 0 to 8.00 percent Slag Cement
(H) About 0.30 to 11.05 percent alkali metal activator
(I) About 0.25 to 2.85 percent Citric Acid
(J) About 0 to 8.00 percent Ground Silica Either component (B) or component (C), or (B) and (C) together must be employed. The combined total of (E), (F), and (G) is not to be less than 5.00 percent of the total cement.

Since all the chemicals are soluble, or can be made soluble in water, and the minerals are as fine, or finer than portland cement, it is not necessary to intergrind or interblend any of them. This dramatically reduces the manufacturing cost and permits locally available materials to be used. However, the mixing sequence of the various material components which make up the composition is pivotal to the present invention.

(A) Water can be any potable water.
(B) Granular boric acid ($H_3BO_3$), used by itself in the proper amount, suspends the hydration of the cementitious materials (D) through (G), inclusive. Boric acid will dissolve in the amount of water indicated. Used together with the alkaline borax, boric acid increases the solubility of the less soluble borax due to the formation of polyborates. The amount of boric acid used, governs the amount of borax used as either one is capable of suspending the hydration of the cementitious materials (D) through (G), inclusive. The preferred amount of boric acid to be employed is between 0.10 to 1.25 percent by weight.

One of the most remarkable and rewarding discoveries made in the present invention, completely contradicts teachings found in prior art cement patents. When used in conjunction with the other components in the cement, boric acid has the ability to provide variable placement times solely based upon the timing of its introduction into the mix. In addition to suspending and helping to establish variable placement time frames, boric acid, together with borax, tempers the subbituminous fly ash, improving the high-early strength gain. Boric acid can be obtained from the United States Borax Corporation.

(C) Borax 5 Mole or borax 10 Mole can be used in granular or powdered form. The preferred amount of borax to be employed is between 0.20 to 2.80 percent, by weight of 10 mole borax. At the lower percent the suspension will not hold for more than 24 hours. When 2.5 percent is employed the borax will suspend the prescribed amount of cementitious materials for an indefinite time. It is preferable to use the borax in combination with boric acid so that variable control over placement time can be exercised. Granular borax ($Na_2B_4O_7.10H_2O$), in the amount required is not soluble in the limited amount of water needed to make high strength concrete unless it is combined with boric acid, or the water is heated. (Solubility table is provided) It gives strength to the cement being formed and helps prevent cracking.

Borax, when mixed with water and cementitious components (D) through (G), inclusive, causes the mix to remain fluid until the last cement making components are added.

(D) Subbituminous fly ash comes from coal burning electric power plants that burn subbituminous coal. This particular fly ash is high in calcium oxide, and is included in the ASTM designation C618-85 as a Class C fly ash. The volume of subbituminous material available is increasing rapidly because it has the lowest emission rating of all the coals that are burned. One skilled in the art will appreciate, how the method of combining the components, enables the various fly ashes from different plants to be easily adapted. Several electric generating, coal burning power plants, such as Houston Light and Power can furnish this type fly ash.

(E) & (F) Type III Portland Cement and Type I Portland Cement are the preferred mineral admixtures employed in this present invention to impart greater density, and abrasion resistance. This is achieved because the particle size, being slightly larger than fly ash, enables the composition of materials to compact. Portland cements would be readily available for those who would use the cement. Each Type has a different set time. Varying the amount of each one used helps fine-tune the exact time of placement, which could be critical in making rapid setting concrete products on high speed production lines. Any portland cement manufactured to meet the ASTM standard C150 is acceptable. The portland cement does not appear to add to or reduce the strengths that are obtained. In addition all Types, or a blend of types, will increase the abrasion resistance and reduce the permeability of the hardened mass. Any portland cement manufacturer, such as La-Farge Corporation, can furnish the types of cements needed.

(G) Any ground slag, which complies with ASTM standard C989, can be employed in this present invention. Slag is used in conjunction with or as a substitute for the Type I or Type III portland cements listed above and imparts the same qualities insofar as abrasion resistance or durability is concerned, and in addition slag provides some glassy silicate components and creates a less permeable mixture. The effect on placement time is similar to Type III portland cement. Slag cement can be obtained from Blue Circle Cement Company.

(H) Granular or flake potassium hydroxide (KOH), is the preferred alkali metal activator to be employed in the present invention because it imparts the maximum activation for the least volume of material used. Although sodium hydroxide, potassium carbonate, and sodium carbonate may be employed, such use would necessitate that a larger volume of such alkali metal activator be employed, which would be less efficient, due to the additional bulk and weight. In as much as the alkali metal activator would not be added until it is time to complete the cement the increased amount by using the other alternatives would not be as desirable. Approximately as much sodium hydroxide as potassium hydroxide would be required and nearly four times as much sodium carbonate or potassium carbonate would be needed. In addition, potassium hydroxide does not introduce more sodium into the system. Potassium hydroxide can be obtained from many chemical companies, such as Occidental Chemical Corporation.

(I) Citric acid (HOOCCH$_2$C(COH)(COOH)CH$_2$COOH), can be used in any of its available grades, including fine crystal, liquid or powder. Additionally, salts of citric acid can be used in place of the citric acid itself. Citric acid is a known retarder for aluminate phases in portland cement, calcium fluoroaluminate, and calcium aluminate cements. In the composition of the present invention the citric acid does not act as a retarder to delay the hydration reactions, but remarkably acts as an accelerator. This discovery together with the previous discussed discovery regarding boric acid, made it possible to alter the placement time, depending on when the citric acid and boric acid are introduced into the system. It is recognized citric acid can be diluted in water before the cementitious components are added. Doing so causes erratic strength development and makes it impossible to take advantage of many of the variable time periods of the present invention because it will severely shorten the placement time. Citric acid can be obtained from many producers such as Miles, Inc.

(J) Ground Silica sold under the registered trade name of SIL-CO-SIL number 250 is preferred, however, any substantially equivalent ground silica may be used. It is entirely optional to the present invention; however, it adds to the density, which improves the durability, of the hardened mass. It helps increase the abrasion resistance and lowers the permeability. The ground silica does not change the transport time, but most remarkably, it reduces the time before set, and does increase the rapid strength gain. If greater rapid strength gain and increased durability were not considerations, the ground silica could be omitted, however, in the present invention it is preferred. Ground silica can be obtained from U.S. Silica Company.

TIME PERIODS

Prior art refers to one (1) time period which is alternately called: working time, open time, plasticity, or workability. It is defined as the total time which starts when water first comes in contact with the cement, and ends when the cement, concrete, or mortar, can no longer be troweled or otherwise shaped. The present invention refers to four (4) time periods. They are:

1. Mixing Time, Includes approximately 2 minutes to dissolve components (B) and/or (C) in the water, and is never less than 5 minutes for any remaining one, or a combination of cement components, to be mixed properly, 2. Transport Time, which begins after the cementitious components (D) through (G), inclusive, have been introduced into the mix water and is terminated, as the user may elect, when the final cement making components (H) through (J) are added, 3. Placement Time, which begins when the transport time ends, and the remaining cement making components (H) through (J) have each been mixed for 5 minutes, or if mixed together, for a total of 5 minutes, 4. Total Work Time, is the sum total of the mixing time, transport time, and placement time of the present invention. It is the same time period prior art calls: "working time", "open time", "plasticity", or "workability".

MIXING SEQUENCES FOR MAKING THE BLENDED HYDRAULIC CEMENTS AND ALTERING THEIR PLACEMENT TIMES

The present invention utilizes any one of the following mixing sequences:

| Mixing sequence 1 | Mixing sequence 2 |
|---|---|
| 1 Water | 1 Water |
| 1 Boric acid | 1 Boric acid |
| 1 Borax | 1 Borax |
| 2 Subbituminous fly ash | 2 Subbituminous fly ash |
| 2 Type III portland cement | 2 Type III portland cement |
| 2 Type I portland cement | 2 Type I portland cement |
| 2 Slag cement | 2 Slag cement |
| 3 Ground silica | 3 Ground silica |
| 4 Potassium hydroxide | 4 Citric acid |
| 5 Citric acid | 5 Potassium hydroxide |
| Mixing sequence 3 | Mixing sequence 4 |
| 1 Water | 1 Water |
| 1 Borax | 1 Borax |
| 2 Subbituminous fly ash | 2 Subbituminous fly ash |
| 2 Type III portland cement | 2 Type III portland cement |
| 2 Type I portland cement | 2 Type I portland cement |
| 2 Slag cement | 2 Slag cement |
| 3 Ground silica | 3 Ground silica |
| 4 Boric acid | 4 Boric acid |
| 5 Potassium hydroxide | 5 Citric acid |
| 6 Citric acid | 6 Potassium hydroxide |
| Mixing sequence 5 | Mixing sequence 6 |
| 1 Water | 1 Water |
| 1 Boric acid | 1 Boric acid |
| 2 Subbituminous fly ash | 2 Subbituminous fly ash |
| 2 Type III portland cement | 2 Type III portland cement |
| 2 Type I portland cement | 2 Type I portland cement |
| 2 Slag cement | 2 Slag cement |
| 3 Ground silica | 3 Ground silica |
| 4 Potassium hydroxide | 4 Citric acid |
| 5 Citric acid | 5 Potassium hydroxide |
| Mixing sequence 7 | Mixing sequence 8 |
| 1 Water | 1 Water |
| 1 Borax | 1 Borax |
| 2 Subbituminous fly ash | 2 Subbituminous fly ash |
| 2 Type III portland cement | 2 Type III portland cement |
| 2 Type I portland cement | 2 Type I portland cement |
| 2 Slag cement | 2 Slag cement |
| 3 Ground silica | 3 Ground silica |
| 4 Potassium hydroxide | 4 Citric acid |
| 5 Citric acid | 5 Potassium hydroxide |
| Mixing sequence 9 | Mixing sequence 10 |
| 1 Water | 1 Water |
| 1 Boric acid | 1 Borax |
| 1 Borax | 2 Subbituminous fly ash |
| 2 Subbituminous fly ash | 2 Type III portland cement |
| 2 Type III portland cement | 2 Type I portland cement |
| 2 Type I portland cement | 2 Slag cement |
| 2 Slag cement | 3 Ground silica |
| 3 Ground silica | 4 Boric acid, together |
| 4 Citric acid, together | with Citric acid, & |
| with Potassium hydroxide | Potassium hydroxide |

Several other unique characteristics of the present invention are exhibited in certain of the mix designs and mixing sequences:

(i) When material component (B) alone, or material component (B) and (C) together have been introduced into the water followed only by material component (D), the free carbon in the fly ash is released and floats to the surface during the mixing process. The occurrence of this phenomenon allows the user to collect and remove the excess carbon. The mixing action causes the carbon to be thrown to the sides of the mixer. There it collects in a ring above the mixture of fly ash, boric acid and water provided the sides of the mixer are slightly tapered.

(ii) Material component (B) when employed alone, or material component (B) and (C) when employed together, will cause the material components (D) through (G), inclusive, to congeal or coagulate if the mixing sequence is suspended and allowed to remain stationary, after the introduction of the last material component of (E), (F) of (G). When the user introduces energy into the mix and then adds the remaining components, the congealed mixture will again become very fluid. Example Nos. 33 and 34 take advantage of this phenomenon. This feature of the present invention allows the user to produce a two-part blended cement binder where the two parts are separated by a pouch, or where one of the parts is packaged separately, for the ultimate user to simply mix and use. This enables the cement of the present invention to eliminate the need for precise measurement of water on the job site, where water is often difficult to obtain, and workers are sometimes not able to measure accurately.

(iii) As long as energy is added to the mixture, the material component (B) together with components (H) and (I) causes the mixture to become highly fluid, enabling the user to pour the material rather than place it. Then several minutes before the placement and finishing time is lost component (B) causes the mixture to thicken and become very plastic. This allows the material to be used in a self-leveling form then be easily troweled and shaped.

(iv) Material components (B) and (C) each impart a soapy, non-sticky characteristic to the mixture which can be very desirable to the user. When the material components (A) through (G), inclusive, are mixed and the user desires to pump or extrude or convey the mix through any of many mechanical applications (prior to the introduction of the remaining material components), the suspended materials can be so handled without the risk of premature set in the equipment.

Unlike prior art, the METHOD for making the blended cement of the present invention, provides, not one, but two different introduction points where the fillers, such as sand and gravel, can be added to the cement to make concrete and mortar. Users of general and special application ready mixed mortar and concrete will find this feature of great benefit, since control of delivered product will be exercised at the point of application and use. In the above 10 mixing sequence examples, aggregates to make mortar or concrete may be added after the cementitious components (D) through (G), inclusive, have been mixed, together with or without the ground silica, or alternatively, may be added after the last blended cement making component is mixed.

In the examples that follow, when fillers are added, they are not part of the cement being formed. They are shown to demonstrate how the versatility of including fillers can be accomplished, and how this versatility can be used advantageously.

In the following examples the neat cement, mortar or concrete tests were placed in 2" cube molds, or in the case of concrete were placed in cylinders and allowed to hydrate. Periodic tests were conducted to determine how long the material remained trowelable. After the samples cured, they were demolded and broken under compression at the various time periods shown.

The following are given as examples of formulations of the blended hydraulic cement of the present invention. They should be considered as illustrative only and not as limiting, in any way, the full scope of the invention as covered in the appended claims. All percentages are by weight. There is a column provided which shows the percentage of all components, including water and ground silica and a separate column showing the percentage of all chemicals and cementitious components only. The ratio of water to the cementitious and chemical components is shown separately and excludes the ground silica.

EXAMPLE 1

(Mixing sequence 1)

A cement was formed, consisting of the following:

| GRAMS | % of GRAMS | % of CHEM. & CEMENTITIOUS | COMPONENTS | ORDER MIXED |
|---|---|---|---|---|
|  |  |  |  | STEP 1 |
| 621 | 18.75 |  | Water | 1ST |
| 21.00 | 0.63 | 0.85 | Boric acid | " |
| 69.51 | 2.10 | 2.80 | Borax | " |
| 2100 | 63.41 | 84.63 | Fly ash | 2ND |
| 105 | 3.17 | 4.23 | P.C. III | " |
| 105 | 3.17 | 4.23 | P.C. I | " |
| 210 | 6.34 |  | Ground silica | 3RD |
|  |  |  |  | STEP 2 |
| 38.49 | 1.16 | 1.55 | KOH | 4TH |
| 42.00 | 1.27 | 1.69 | Citric acid | 5TH |

| | | | | |
|---|---|---|---|---|
| Water/cement ratio: | 0.25 | | 1 day | 3,989 p.s.i. |
| Mixing Time: | | 22 mins. | 3 day | 7,072 p.s.i. |
| Transport.Time: | 2 hrs | 0 mins. | 7 day | 8,373 p.s.i. |
| Placement Time: | 3 hrs | 0 mins. | 14 day | 9,052 p.s.i. |
| Total Work Time: | 5 hrs | 22 mins. | 28 day | 10,113 p.s.i. |

After the ground silica was added, the partially made cement was held 2 hours(transport time). Then 3789 grams of sand and 4899 grams of gravel were added to make concrete after the last two cement making components were mixed.

EXAMPLE 2

(Mixing sequence 1)

A cement was formed, consisting of the following:

| GRAMS | % of GRAMS | % of CHEM. & CEMENTITIOUS | COMPONENTS | ORDER MIXED |
|---|---|---|---|---|
|  |  |  |  | STEP 1 |
| 250 | 17.81 |  | Water | 1ST |
| 9 | 0.64 | 0.85 | Boric acid | " |
| 30 | 2.14 | 2.82 | Borax | " |
| 900 | 64.13 | 84.63 | Fly ash | 2ND |
| 45 | 3.21 | 4.23 | P.C. III | " |
| 45 | 3.21 | 4.23 | P.C. I | " |
| 90 | 6.41 |  | Ground silica | 3RD |
|  |  |  |  | STEP 2 |
| 16.5 | 1.18 | 1.55 | KOH | 4TH |
| 18 | 1.28 | 1.69 | Citric acid | 5TH |

Water/cement ratio: 0.24 (ex.silica)     1 day     6,625 p.s.i.

| | | | | |
|---|---|---|---|---|
| Mixing Time: | | 22 min. | 3 day | 8,625 p.s.i. |
| Transport Time: | 21 hrs | 30 min. | 7 day | 11,125 p.s.i. |
| Placement Time: | | 30 min. | 14 day | 11,500 p.s.i. |
| Total Work Time: | 22 hrs | 22 min. | 28 day | 13,500 p.s.i. |

To make mortar 810 grams of sand were added, together with the ground silica. The partially made cement was held for 21 hours and 30 minutes(transport time). After the transport time the last two cement making components were mixed.

This cement was made again into a mortar following the same procedure. A test cylinder was made and the cylinder was subjected to a:

Rapid chloride permeability test (28 days) AASHTO T-277

Result-302 Coulombs

SHRINKAGE TESTS
(According to: ASTM C-157)

| Initial reading at 2 hours | | Initial reading at 24 hours | |
|---|---|---|---|
| 6 hours | 0.014% | 8 days | 0.031% |
| 1 day | 0.063% | 14 days | 0.039% |
| 8 days | 0.094% | 28 days | 0.063% |
| 14 days | 0.102% | | |
| 28 days | 0.126% | | |

EXAMPLE 3

(Mixing sequence 2)

A cement was formed, consisting of the following:

| GRAMS | % of GRAMS | % of CHEM. & CEMENTITIOUS | COMPONENTS | ORDER MIXED |
|---|---|---|---|---|
| | | | | STEP 1 |
| 250 | 17.81 | | Water | 1ST |
| 9 | 0.64 | 0.85 | Boric acid | " |
| 30 | 2.14 | 2.82 | Borax | " |
| 900 | 64.13 | 84.63 | Fly ash | 2ND |
| 45 | 3.21 | 4.23 | P.C. III | " |
| 45 | 3.21 | 4.23 | P.C. I | " |
| 90 | 6.41 | | Ground silica | 3RD |
| | | | | STEP 2 |
| 18 | 1.28 | 1.69 | Citric acid | 4TH |
| 16.5 | 1.18 | 1.55 | KOH | 5TH |
| Water/cement ratio: | 0.24 (ex.silica) | | 1 day | 7,625 p.s.i. |
| Mixing Time: | 22 min. | | 3 day | 9,000 p.s.i. |
| Transport Time: | 0 | | 7 day | 9,625 p.s.i. |
| Placement Time: | 35 min. | | 14 day | 12,000 p.s.i. |
| Total Work Time: | 57 min. | | 28 day | 12,000 p.s.i. |

To make mortar 810 grams of sand were added together with the 90 grams of ground silica, after the cementitious components were mixed, and before the citric acid was mixed.

EXAMPLE 4

(Mixing sequence 2)

A cement was formed, consisting of the following:

| GRAM | % of GRAMS | % of CHEM. & CEMENTITIOUS | COMPONENTS | ORDER MIXED |
|---|---|---|---|---|
| | | | | STEP 1 |
| 621 | 18.75 | | Water | 1ST |
| 21 | 0.63 | 0.85 | Boric acid | " |
| 69.51 | 2.10 | 2.80 | Borax | " |
| 2100 | 63.41 | 84.63 | Fly ash | 2ND |
| 105 | 3.17 | 4.23 | P.C. III | " |
| 105 | 3.17 | 4.23 | P.C. I | " |
| 210 | 6.34 | | Ground silica | 3RD |
| | | | | STEP 2 |
| 42 | 1.27 | 1.69 | Citric acid | 4TH |
| 38.49 | 1.16 | 1.55 | KOH | 5TH |
| Water/cement ratio: | 0.25 | | 1 day | 4,243 p.s.i. |
| Mixing Time: | | 22 mins. | 3 day | 7,256 p.s.i. |
| Transport Time: | 2 hrs | 0 mins. | 7 day | 9,052 p.s.i. |
| Placement Time: | 1 hr | 0 mins. | 14 day | 9,102 p.s.i. |
| Total Work Time: | 3 hrs | 22 mins | 28 day | 10,042 p.s.i. |

After the cementitious components were mixed the partially made cement and fillers were held for 2 hours (transport time). During this time the 210 grams of ground silica, 3789 grams of sand, and 4899 grams of gravel were included, to make concrete after the last two cement components were mixed.

EXAMPLE 5

(Mixing sequence 3)

A cement was formed, consisting of the following:

| GRAMS | % of GRAMS | % of CHEN. & CEMENTITIOUS | COMPONENTS | ORDER MIXED |
|---|---|---|---|---|
| | | | | STEP 1 |
| 250 | 18.06 | | Warm Water | 1ST |
| 15 | 1.08 | 1.44 | Borax | " |
| 900 | 65.03 | 86.21 | Fly ash | 2ND |
| 45 | 3.25 | 4.31 | P.C. III | " |
| 45 | 3.25 | 4.31 | P.C. I | " |
| 90 | 6.50 | | Ground silica | 3RD |
| | | | | STEP 2 |
| 4.5 | 0.33 | 0.43 | Boric acid | 4TH |
| 16.5 | 1.19 | 1.58 | KOH | 5TH |
| 18 | 1.30 | 1.72 | Citric acid | 6TH |
| Water/cement ratio: | 0.24 (ex.silica) | | 1 day | 6,675 p.s.i. |
| Mixing Time: | 27 min. | | 3 day | 8,500 p.s.i. |
| Transport Time: | 0 min. | | 7 day | 9,113 p.s.i. |
| Placement Time: | 30 min. | | 14 day | 10,688 p.s.i. |
| Total Work Time: | 57 min. | | 28 day | 11,450 p.s.i. |

Inasmuch as the boric acid used was introduced after the cementitious materials were mixed the 0.24 water/cement ratio would not dissolve the 1.43 parts of borax unless the water was heated.

*The introduction of the boric acid immediately preceding the potassium hydroxide and citric acid instead of mixing it with borax provides a longer placement time.

To make mortar 810 grams were added with the ground silica.

EXAMPLE 6

(Mixing sequence 3)

A cement was formed, consisting of the following:

| GRAMS | % of GRAMS | % of CHEM. & CEMENTITIOUS | COMPONENTS | ORDER MIXED |
|---|---|---|---|---|
| | | | | STEP 1 |
| 621 | 18.75 | | Warm Water | 1ST |
| 69.51 | 2.10 | 2.80 | Borax | " |
| 2100 | 63.41 | 84.63 | Fly ash | 2ND |

-continued

| | | | | |
|---|---|---|---|---|
| 105 | 3.17 | 4.23 | P.C. III | " |
| 105 | 3.17 | 4.23 | P.C. I | " |
| | | | | STEP 2 |
| 210 | 6.34 | | Ground silica | 3RD |
| 21.00 | 0.63 | 0.85 | Boric acid | 4TH |
| 38.49 | 1.16 | 1.55 | KOH | 5TH |
| 42.00 | 1.27 | 1.69 | Citric acid | 6TH |

| | | | | |
|---|---|---|---|---|
| Water/cement ratio: | 0.25 | | 1 day | 4,243 p.s.i. |
| Mixing Time: | | 27 min. | 2 day | 7,178 p.s.i. |
| Transport Time: | 16 hrs | 50 min. | 7 day | 8,345 p.s.i. |
| Placement Time: | | 49 min. | 14 day | 9,123 p.s.i. |
| Total Work Time: | 18 hrs | 06 min. | 28 day | 9,760 p.s.i. |

At the time ground silica was included, 3789 grams of sand and 4899 grams of gravel were added to make concrete after the last three components were mixed.

Although the partially made cement was held 16 hours and 50 minutes (transport time), the cement still provided 49 minutes placement time, because the boric acid was introduced just before the final two cement components were mixed.

EXAMPLE 7

(Mixing sequence 3)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 250 | 17.51 | | Warm water | 1ST |
| 40 | 2.80 | 3.68 | Borax | " |
| 900 | 63.05 | 82.76 | Fly ash | 2ND |
| 45 | 3.15 | 4.14 | P.C. III | " |
| 45 | 3.15 | 4.14 | P.C. I | " |
| 90 | 6.30 | | Ground silica | 3RD |
| | | | | STEP 2 |
| 11.88 | 0.83 | 1.09 | Boric acid | 4TH |
| 21.8 | 1.53 | 2.00 | KOH | 5TH |
| 23.8 | 1.67 | 2.19 | Citric acid | 6TH |

| | | | | |
|---|---|---|---|---|
| Water/cement ratio: | 0.18 | | 1 day | 6,000 p.s.i. |
| Mixing Time: | | 27 min. | 3 day | 8,000 p.s.i. |
| Transport Time: | 67 hrs. | 15 min. | 7 day | 10,875 p.s.i. |
| Placement Time: | 4 hrs. | 40 min. | 14 day | 11,625 p.s.i. |
| Total Work Time: | 72 hrs. | 22 min. | 28 day | 11,875 p.s.i. |

After the ground silica was mixed the process for making the cement was suspended 67 hours and 15 minutes. Just before last three components were mixed, 810 grams of sand were added to also make mortar, This example shows very rapid strength gain is possible following long transport time and long placement time.

**With the exception of the boric acid and borax, the number of grams used to make the cement in this example and Ex. 19 are identical. Comparing these examples demonstrates the synergism between the boric acid and borax, and then between the boric acid, borax, citric acid, and potassium hydroxide. The strengths in this example increased 2,000 p.s.i., and the placement time was extended to 4 hours and 40 minutes, compared to the lesser strengths and 15 minutes in Ex. 19.

It is important to note that while there is placement time lost by holding the cementitious components in suspension over night, there is little further loss in placement time by holding the material for a week, provided sufficient borax and/or boric acid has been used.

EXAMPLE 8

(Mixing sequence 3)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 250 | 17.81 | | Warm water | 1ST |
| 30 | 2.14 | 2.82 | Borax | " |
| 900 | 64.13 | 84.63 | Fly ash | 2ND |
| 45 | 3.21 | 4.23 | P.C. III | " |
| 45 | 3.21 | 4.23 | P.C. I | " |
| 90 | 6.41 | | Ground silica | 3RD |
| | | | | STEP 2 |
| 9 | 0.64 | 0.85 | Boric acid | 4TH |
| 16.5 | 1.18 | 1.55 | KOH | 5TH |
| 18 | 1.28 | 1.69 | Citric acid | 6TH |

| | | | | |
|---|---|---|---|---|
| Water/cement ratio: | 0.24 | | 1 day | 8,000 p.s.i. |
| Mixing Time: | | 27 min. | 3 day | 9,500 p.s.i. |
| Transport Time: | 16 hrs | 30 min. | 7 day | 12,000 p.s.i. |
| Placement Time: | 2 hrs | 12 min. | 14 day | 12,125 p.s.i. |
| Total Work Time | 19 hrs | 09 min. | 28 day | 14,500 p.s.i. |

After the cementitious components were mixed, the partially made cement was held overnight. The following day, 810 grams of sand were included, before the last three components were mixed, to complete the cement and mortar.

This example compared to Ex. 9 shows how the longer placement time obtained by mixing the citric acid last in this example, off set the loss in placement time caused by holding the mixture 16 hours and 30 minutes.

EXAMPLE 9

(Mixing sequence 4)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 250 | 17.81 | | Warm water | 1ST |
| 30 | 2.14 | 2.82 | Borax | " |
| 900 | 64.13 | 84.63 | Fly ash | 2ND |
| 45 | 3.21 | 4.23 | P.C. III | " |
| 45 | 3.21 | 4.23 | P.C.I | " |
| 90 | 6.41 | | Ground silica | 3RD |
| | | | | STEP 2 |
| 9 | 0.64 | 0.85 | Boric acid | 4TH |
| 18 | 1.28 | 1.69 | Citric acid | 5TH |
| 16.5 | 1.18 | 1.55 | KOH | 6TH |

| | | | | |
|---|---|---|---|---|
| Water/cement ratio: | 0.24 | | 1 day | 6,450 p.s.i. |
| Mixing Time: | | 27 min. | 3 day | 8,900 p.s.i. |
| Transport Time: | | 0 min. | 7 day | 10,050 p.s.i. |
| Placement Time: | 2 hrs | 40 min. | 14 day | 11,875 p.s.i. |
| Total Work Time: | 3 hrs | 07 min. | 28 day | 12,000 p.s.i. |

When the 90 grams of silica were mixed, 810 grams of sand were included, before the last three components were mixed to complete the cement and mortar.

There was no loss in placement time in this example, because the partially made cement was not held. Therefore, mixing the potassium hydroxide last provided almost the same placement time as Ex. 8.

The ability to make adjustments in the placement time at the place where the cement is to be used, will increase productivity by not having to wait for cements to harden and gain strength.

At the same time, when placement times are needed, they should not be sacrificed, fearing that the rapid strength gaining cement will suddenly lose its workability.

EXAMPLE 10

(Mixing sequence 5)

A cement was formed, consisting of the following:

| GRAM | % of GRAMS | % of CHEM. & CEMENTI-TIOUS | COM-PONENTS | ORDER MIXED |
|---|---|---|---|---|
| | | | | STEP 1 |
| 250 | 18.13 | | Water | 1ST |
| 7.2 | 0.52 | 0.69 | Boric acid | " |
| 900 | 65.28 | 86.67 | Fly ash | 2ND |
| 45 | 3.26 | 4.33 | P.C. III | " |
| 45 | 3.26 | 4.33 | P.C. I | " |
| 90 | 6.53 | | Ground silica | 3RD |
| | | | | STEP 2 |
| 19.8 | 1.44 | 1.91 | KOH | 4TH |
| 21.6 | 1.57 | 2.08 | Citric acid | 5TH |
| Water/cement ratio: | 0.24 | | 1 day | 6,625 p.s.i. |
| Mixing Time: | 22 min. | | 3 day | 8,125 p.s.i. |
| Transport Time: | 0 | | 7 day | 9,062 p.s.i. |
| Placement Time: | | 30 sec. | 14 day | 10,500 p.s.i. |
| Total Work Time: | 22 min. | 30 sec. | 28 day | 11,500 p.s.i. |

As the ground silica was mixed, 810 grams of sand were added, to make mortar when the last two components were mixed to complete the cement.

Placement times ranging from 30 seconds to 17 minutes are ideal for a shotcrete operation.

Few applications for structural hydraulic cements, which gain rapid strengths also want very short placement times. Special cements have been made for such applications. However, the cement of the present invention, which provides extremely long placement time, can also provide very short placement times.

EXAMPLE 11

(Mixing sequence 5)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 18.10 | | Water | 1ST |
| 10 | 0.72 | 0.96 | Boric acid | " |
| 900 | 65.15 | 86.42 | Fly ash | 2ND |
| 45 | 3.26 | 4.32 | P.C. III | " |
| 45 | 3.26 | 4.32 | P.C. I | " |
| 90 | 6.52 | | Ground silica | 3RD |
| | | | | STEP 2 |
| 19.8 | 1.43 | 1.90 | KOH | 4TH |
| 21.6 | 1.56 | 2.07 | Citric acid | 5TH |
| Water/cement ratio: | 0.24 | 1 day | 5,500 p.s.i. |
| Mixing Time: | 22 min. | 3 day | 6,063 p.s.i. |
| Transport Time: | 0 min. | 7 day | 7,575 p.s.i. |
| Placement Time | 17 min. | 14 day | 7,625 p.s.i. |
| Total Work Time: | 39 min. | 28 day | 8,750 p.s.i. |

During the process of making the cement 810 grams of sand were added to also make mortar.

As stated earlier, the last two components added, after the introduction of only boric acid, provide the opposite placement time, as when the same order of mixing follows only borax or borax and boric acid, when the percent of borax is 66% or greater.

EXAMPLE 12

(Mixing sequence 5)

A cement was formed consisting, of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 18.03 | | Water | 1ST |
| 15 | 1.08 | 1.43 | Boric acid | " |
| 900 | 64.92 | 86.01 | Fly ash | 2ND |
| 45 | 3.25 | 4.30 | P. C. III | " |
| 45 | 3.25 | 4.30 | P. C. I | " |
| 90 | 6.49 | | Ground silica | 3RD |
| | | | | STEP 2 |
| 19.8 | 1.43 | 1.89 | KOH | 4TH |
| 21.6 | 1.56 | 2.06 | Citric acid | 5TH |
| Water/cement ratio: | 0.24 | | 1 day | 4,125 p.s.i. |
| Mixing Time: | | 22 min. | 3 day | 8,000 p.s.i. |
| Transport Time: | | 0 | 7 day | 8,125 p.s.i. |
| Placement Time: | 1 hr | 15 min. | 14 day | 9,500 p.s.i. |
| Total Work Time: | 1 hr | 37 min. | 28 day | 9,950 p.s.i. |

During the process of making the cement, 810 grams of sand were added, to also make mortar.

By comparing this example to Ex. 13, the loss of placement time caused by holding the partially made cement is very evident. The components used and mixing sequences 3, and 4 (shown before) demonstrate how this problem was solved.

EXAMPLE 13

(Mixing sequence 5)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 18.03 | | Water | 1ST |
| 15 | 1.08 | 1.43 | Boric acid | " |
| 900 | 64.92 | 86.01 | Fly ash | 2ND |
| 45 | 3.25 | 4.30 | P.C. III | " |
| 45 | 3.25 | 4.30 | P.C. I | " |
| 90 | 6.49 | | Ground silica | 3RD |
| | | | | STEP 2 |
| 19.8 | 1.43 | 1.89 | KOH | 4TH |
| 21.6 | 1.56 | 2.06 | Citric acid | 5TH |
| Water/cement ratio: | 0.24 | | 1 day | 6,200 p.s.i. |
| Mixing Time: | | 22 min. | 7 day | 7,644 p.s.i. |
| Transport Time: | 15 hrs | 30 min. | 14 day | 8,625 p.s.i. |
| Placement Time: | | 15 min. | 28 day | 8,813 p.s.i. |
| Total Work Time: | 16 hrs | 07 min. | | |

During the process of making the cement, 810 grams of sand were added, to also make mortar.

One hour of placement time was lost by holding (transport time) the partially made cement and partially made mortar for 15 hours and 30 minutes. Examples which follow will show the loss in placement time by long transport or suspension periods does not continue to decrease as the longer time period increases, provided enough boric acid and/or borax is used to stop the hydration process

EXAMPLE 14

(Mixing sequence 5)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 17.96 | | Water | 1ST |
| 16.5 | 1.19 | 1.57 | Boric acid | " |
| 900 | 64.65 | 85.54 | Fly ash | 2ND |
| 45 | 3.23 | 4.28 | P.C. III | " |
| 45 | 3.23 | 4.28 | P.C. I | " |
| 90 | 6.47 | | Ground silica | 3RD |
| | | | | STEP 2 |
| 21.8 | 1.57 | 2.07 | KOH | 4TH |
| 23.8 | 1.71 | 2.26 | Citric acid | 5TH |

| Water/cement ratio: | 0.24 | 1 day | 6,125 p.s.i. |
|---|---|---|---|
| Mixing Time: | 22 min. | 3 day | 8,000 p.s.i. |
| Transport Time: | 0 min. | 7 day | 9,125 p.s.i. |
| Placement Time: | 24 min. | 14 day | 10,625 p.s.i. |
| Total Work Time: | 46 min. | 28 day | 10,775 p.s.i. |

During the process of making the cement, 810 grams of sand were added, to also make mortar.

EXAMPLE 15

(Mixing sequence 5)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 17.48 | | Water | 1ST |
| 30 | 2.10 | 2.75 | Boric acid | " |
| 900 | 62.91 | 82.52 | Fly ash | 2ND |
| 45 | 3.15 | 4.13 | P.C. III | " |
| 45 | 3.15 | 4.13 | P.C. I | " |
| 90 | 6.29 | | Ground silica | 3RD |
| | | | | STEP 2 |
| 34 | 2.38 | 3.12 | KOH | 4TH |
| 36.6 | 2.56 | 3.36 | Citric acid | 5TH |

| Water/cement ratio: | 0.23 | | | |
|---|---|---|---|---|
| Mixing Time: | | 22 min. | 1 day | 5,375 p.s.i. |
| Transport Time: | 42 hrs | 46 min. | 7 day | 6,500 p.s.i. |
| Placement Time: | | 23 min. | 14 day | 8,063 p.s.i. |
| Total Work Time: | 43 hrs | 31 min. | | |

After the addition of the cementitious components the partially made cement was suspended for 42 hours and 46 minutes.

EXAMPLE 16

(Mixing sequence 6)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 18.24 | | Water | 1ST |
| 6 | 0.44 | 0.58 | Boric acid | " |
| 900 | 65.67 | 87.33 | Fly ash | 2ND |
| 45 | 3.28 | 4.37 | P.C. III | " |
| 45 | 3.28 | 4.37 | P.C. I | " |
| 90 | 6.57 | | Ground silica | 3RD |
| | | | | STEP 2 |
| 18 | 1.31 | 1.75 | Citric acid | 4TH |
| 16.5 | 1.20 | 1.60 | KOH | 5TH |

| Water/cement ratio | 0.24 | | |
|---|---|---|---|
| Mixing Time: | 22 min. | 1 day | 7,125 p.s.i. |
| Transport Time: | 0 min. | 3 day | 7,500 p.s.i. |
| Placement Time: | 34 min. | 7 day | 7,750 p.s.i. |
| Total Work Time | 56 min. | 14 day | 8,063 p.s.i. |
| | | 28 day | 9,050 p.s.i. |

EXAMPLE 17

(Mixing sequence 6)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 18.10 | | Water | 1ST |
| 10 | 0.72 | 0.96 | Boric acid | " |
| 900 | 65.15 | 86.42 | Fly ash | 2ND |
| 45 | 3.26 | 4.32 | P.C. III | " |
| 45 | 3.26 | 4.32 | P.C. I | " |
| 90 | 6.52 | | Ground silica | 3RD |
| | | | | STEP 2 |
| 21.6 | 1.56 | 2.07 | Citric acid | 4TH |
| 19.8 | 1.43 | 1.90 | KOH | 5TH |

| Water/cement ratio: | 0.24 | 1 day | 5,563 p.s.i. |
|---|---|---|---|
| Mixing Time: | 22 min. | 3 day | 6,000 p.s.i. |
| Transport Time: | 0 | 7 day | 7,625 p.s.i. |
| Placement Time: | 30 min. | 14 day | 8,063 p.s.i. |
| Total Work Time: | 52 min. | 28 day | 8,500 p.s.i. |

During the process for making the cement, 810 grams of sand were added to also make mortar.

The formulations of this example and Ex. 11 are identical. Only the order of mixing the last two components were reversed to alter the placement time.

EXAMPLE 18

(Mixing sequence 6)

A cement was formed, consisting of the following:

| GRAMS | % of GRAMS | % of CHEM. & CEMENTI-TIOUS | COM-PONENTS | ORDER MIXED |
|---|---|---|---|---|
| | | | | STEP 1 |
| 250 | 17.96 | | Water | 1ST |
| 16.5 | 1.19 | 1.57 | Boric acid | " |
| 900 | 64.65 | 85.54 | Fly ash | 2ND |
| 45 | 3.23 | 4.28 | P.C. III | " |
| 45 | 3.23 | 4.28 | P.C. I | " |
| 90 | 6.47 | | Ground silica | 3RD |
| | | | | STEP 2 |
| 23.8 | 1.71 | 2.26 | Citric acid | 4TH |
| 21.8 | 1.57 | 2.07 | KOH | 5TH |

| Water/cement ratio: | 0.24 | | 1 day | 5,188 p.s.i. |
|---|---|---|---|---|
| Mixing Time: | | 22 min. | 3 day | 6,500 p.s.i. |
| Transporting Time: | | 0 | 7 day | 7,538 p.s.i. |
| Placement Time: | | 45 min. | 14 day | 8,813 p.s.i. |
| Total Work Time: | 1 hr | 07 min. | 28 day | 9,625 p.s.i. |

During the process of making the cement, 810 grams of sand were added to also make mortar.

The formulations for making the cement in this example and Ex. 14 are identical. Only the order of mixing the last two components were reversed to alter the placement time.

EXAMPLE 19

(Mixing sequence 6)

A cement was formed, consisting of the following:

| GRAMS | % of GRAMS | % of CHEM. & CEMENTI-TIOUS | COMPONENTS | ORDER MIXED |
|---|---|---|---|---|
| | | | | STEP 1 |
| 250 | 17.96 | | Water | 1ST |
| 16.5 | 1.19 | 1.57 | Boric acid | " |
| 900 | 64.65 | 85.54 | Fly ash | 2ND |
| 45 | 3.23 | 4.28 | P.C. III | " |
| 45 | 3.23 | 4.28 | P.C. I | " |
| 90 | 6.47 | | Ground silica | 3RD |
| | | | | STEP 2 |
| 23.8 | 1.71 | 2.26 | Citric acid | 4TH |
| 21.8 | 1.57 | 2.07 | KOH | 5TH |
| Water/cement ratio: | 0.24 | | 1 day | 6,000 p.s.i. |
| Mixing Time: | | 22 min. | 7 day | 7,125 p.s.i. |
| Transport Time: | 19 hrs | 30 min. | 14 day | 9,867 p.s.i. |
| Placement Time: | | 15 min. | 28 day | 9,875 p.s.i. |
| Total Work Time: | 20 hrs | 07 min. | | |

After the ground silica was mixed the process for making the cement was held 19 hours and 30 minutes (transport time). Just before the last two components were mixed, 810 grams of sand were added to also make mortar.

EXAMPLE 20

(Mixing sequence 7)

A cement was formed, consisting of the following:

| GRAMS | % of GRAMS | % of CHEM. & CEMENTI-TIOUS | COMPONENTS | ORDER MIXED |
|---|---|---|---|---|
| | | | | STEP 1 |
| 205 | 16.71 | | Warm water | 1ST |
| 20 | 1.63 | 1.96 | Borax | " |
| 900 | 73.36 | 88.07 | Fly ash | 2ND |
| 90 | 7.34 | 8.81 | P.C. III | " |
| | | | | STEP 2 |
| 6.9 | 0.56 | 0.68 | KOH | 3RD |
| 5 | 0.41 | 0.49 | Citric acid | 4TH |
| Water/cement ratio: | 0.20 | | | |
| Mixing Time: | | 22 min. | 2 day | 5,063 p.s.i. |
| Transport Time: | | 0 min. | 4 day | 5,500 p.s.i. |
| Placement Time: | 1 hr | 07 min. | 87 day | 9,875 p.s.i. |
| Total Work Time: | 1 hr | 29 min. | | |

After the cementitious materials were mixed, 990 grams of sand were added to make mortar after the last two cement making components were added.

The small percent of Type III portland cement caused the hardened mortar to become very dense and much more abrasive resistant. In addition the portland cement extended the placement time.

EXAMPLE 21

(Mixing sequence 7)

A cement was formed, consisting of the following:

| GRAMS | % of GRAMS | % of CHEM. & CEMENTI-TIOUS | COMPONENTS | ORDER MIXED |
|---|---|---|---|---|
| | | | | STEP 1 |
| 220 | 16.52 | | Warm water | 1ST |
| 20 | 1.50 | 1.96 | Borax | " |
| 900 | 67.57 | 88.07 | Fly ash | 2ND |
| 90 | 6.76 | 8.81 | P.C. III | " |
| 90 | 6.76 | | Ground silica | 3RD |
| | | | | STEP 2 |
| 6.9 | 0.52 | 0.68 | KOH | 4TH |
| 5 | 0.38 | 0.49 | Citric acid | 5TH |
| Water/cement ratio: | 0.22 | | | |
| Mixing Time: | | 22 min. | 2 day | 8,906 p.s.i. |
| Transport Time: | | 0 min. | 4 day | 9,800 p.s.i. |
| Placement Time: | | 35 min. | 9 day | 10,500 p.s.i. |
| Total Work Time: | | 57 min. | | |

Ground silica was added after the cementitious components were mixed. At that time 810 grams of sand were added to also make mortar.

This example was mixed in the identical manner as Ex. 20. The only difference between the two was the addition of ground silica. The placement time was cut from 1 hour and 7 minutes to 35 minutes. What was even more surprising was the increase in the early strengths. The 4 day strengths nearly doubled, and the 9 day strengths were higher than the 87 day strengths of Ex. 20.

EXAMPLE 22

(Mixing sequence 7)

A cement was formed, consisting of the following:

| GRAMS | % of GRAMS | % of CHEM. & CEMENTI-TIOUS | COMPONENTS | ORDER MIXED |
|---|---|---|---|---|
| | | | | STEP 1 |
| 220 | 16.52 | | Warm water | 1ST |
| 20 | 1.50 | 1.96 | Borax | " |
| 900 | 67.57 | 88.07 | Fly ash | 2ND |
| 75 | 5.63 | 7.34 | P.C. III | " |
| 15 | 1.13 | 1.47 | P.C. I | " |
| 90 | 6.76 | | Ground silica | 3RD |
| | | | | STEP 2 |
| 6.9 | 0.52 | 0.68 | KOH | 4TH |
| 5 | 0.38 | 0.49 | Citric acid | 5TH |
| Water/cement ratio: | 0.22 | | 2 day | 6,750 p.s.i. |
| mixing Time: | | 22 min. | 6 day | 8,050 p.s.i. |
| Transport Time: | | 0 min. | 7 day | 7,975 p.s.i. |
| Placement Time: | | 54 min. | 28 day | 9,199 p.s.i. |
| Total Work Time: | 1 hr | 16 min. | | |

When the ground silica was mixed, 810 grams of sand were added to also make mortar.

Because the ground silica had cut the placement time in Ex. 21 by 32 minutes from Ex. 20, 15 grams of Type I portland cement replaced 15 grams of Type III portland cement making the placement time of this example nearly the same as Ex. 20.

EXAMPLE 23

(Mixing sequence 7)

A cement was formed, consisting of the following:

| GRAMS | % of GRAMS | % of CHEM. & CEMENTI-TIOUS | COMPONENTS | ORDER MIXED |
|---|---|---|---|---|
| | | | | STEP 1 |
| 270 | 19.10 | | Warm water | 1ST |
| 29 | 2.05 | 2.75 | Borax | " |
| 900 | 63.67 | 85.43 | Fly ash | 2ND |
| 45 | 3.18 | 4.27 | P.C. III | " |

-continued

| 45 | 3.18 | 4.27 | P.C. I | " |
| --- | --- | --- | --- | --- |
| 90 | 6.38 | | Ground silica | 3RD |
| | | | | STEP 2 |
| 16.5 | 1.17 | 1.57 | KOH | 4TH |
| 18 | 1.27 | 1.71 | Citric acid | 5TH |
| Water/cement ratio: | 0.26 | | | |
| Mixing Time: | | 22 min. | 8 day | 12,000 p.s.i. |
| Transport Time: | 54 hrs | 0 min. | 1 day | 12,450 p.s.i. |
| Placement Time: | | 4 min. | 28 day | 13,375 p.s.i. |
| Total Work Time: | 54 hrs | 26 min. | | |

After the ground silica was added, the partially made cement was held 54 hours (transport time). At the end of the transport time the last two cement making components were added and mixed, then 810 grams of sand were added to make mortar.

EXAMPLE 24

(Mixing sequence 7)

A cement was formed, consisting of the following:

| GRAMS | % of GRAMS | % of CHEM. & CEMENTI-TIOUS | COM-PONENTS | ORDER MIXED |
| --- | --- | --- | --- | --- |
| | | | | STEP 1 |
| 250 | 18.28 | | Warm water | 1ST |
| 20 | 1.46 | 1.95 | Borax | " |
| 900 | 65.83 | 87.61 | Fly ash | 2ND |
| 90 | 6.58 | 8.76 | P.C. I | " |
| 90 | 6.58 | | Ground silica | 3RD |
| | | | | STEP 2 |
| 8.25 | 0.60 | 0.80 | KOH | 4TH |
| 9 | 0.66 | 0.88 | Citric acid | 5TH |
| Water/cement ratio: | 0.24 | | | |
| Mixing Time: | | 22 min. | | |
| Transport Time: | | 0 min. | 7 day | 6,813 p.s.i. |
| Placement Time: | 1 hr | 35 min. | 14 day | 10,000 p.s.i. |
| Total Work Time: | 1 hr | 57 min. | 28 day | 10,625 p.s.i. |

When the ground silica was mixed, 990 grams of sand were added to also make mortar.

In this example all of the Type III portland cement was replaced with Type I portland cement and the placement time was an hour longer than Ex. 21, even after increasing the citric acid and potassium hydroxide.

EXAMPLE 25

(Mixing sequence 7)

A cement was formed, consisting of the following:

| GRAMS | % of GRAMS | % of CHEM. & CEMENTI-TIOUS | COM-PONENTS | ORDER MIXED |
| --- | --- | --- | --- | --- |
| | | | | STEP 1 |
| 205 | 16.71 | | Warm Water | 1ST |
| 20 | 1.63 | 1.96 | Borax | " |
| 900 | 73.36 | 88.07 | Fly ash | 2ND |
| 90 | 7.34 | 8.81 | Slag | " |
| | | | | STEP 2 |
| 6.9 | 0.56 | 0.68 | KOH | 3RD |
| 5 | 0.41 | 0.49 | Citric acid | 4TH |
| Water/cement ratio: | 0.20 | | 1 day | 6,125 p.s.i. |
| Mixing Time: | | 17 min. | 3 day | 6,938 p.s.i. |
| Transport Time: | | 0 min. | 7 day | 7,725 p.s.i. |
| Placement Time: | 1 hr | 20 min | | |
| Total Work Time: | 1 hr | 37 min. | | |

After the cementitious components were mixed, 990 grams of sand were added, then the last two components were mixed completing the cement and mortar.

The Type III portland cement used in Ex. 20, shown earlier, was replaced with an equal amount of slag cement. The abrasive resistance was almost identical and what was most surprising, the placement time was also.

EXAMPLE 26

(Mixing sequence 7)

A cement was formed, consisting of the following:

| GRAMS | % of GRAMS | % of CHEM. & CEMENTI-TIOUS | COM-PONENTS | ORDER MIXED |
| --- | --- | --- | --- | --- |
| | | | | STEP 1 |
| 205 | 16.71 | | Warm Water | 1ST |
| 20 | 1.63 | 1.96 | Borax | " |
| 900 | 73.36 | 88.07 | Fly ash | 2ND |
| 90 | 7.34 | 8.81 | Slag | " |
| | | | | STEP 2 |
| 6.9 | 0.56 | 0.68 | KOH | 3RD |
| 5 | 0.41 | 0.49 | Citric acid | 4TH |
| Water/cement ratio: | 0.20 | | 1 day | 4,900 p.s.i. |
| Mixing Time: | | 17 min. | 3 day | 6,125 p.s.i. |
| Transport Time: | 14 hrs | 25 min. | 7 day | 7,500 p.s.i. |
| Placement Time: | | 42 min. | 14 day | 9,650 p.s.i. |
| Total Work Time: | 15 hrs | 24 min. | 28 day | 10,100 p.s.i. |

After the cementitious components were mixed the partially made cement was held for 14 hours and 25 minutes. During this time 990 grams of sand were added, then the last two components were mixed completing the cement and mortar, with the resulting placement time of 42 minutes.

EXAMPLE 27

(Mixing sequence 8)

A cement was formed, consisting of the following:

| GRAMS | % of GRAMS | % of CHEM. & CEMENTI-TIOUS | COM-PONENTS | ORDER MIXED |
| --- | --- | --- | --- | --- |
| | | | | STEP 1 |
| 205 | 16.71 | | Warm Water | 1ST |
| 20 | 1.63 | 1.96 | Borax | " |
| 900 | 73.36 | 88.07 | Fly ash | 2ND |
| 90 | 7.34 | 8.81 | P.C. III | " |
| | | | | STEP 2 |
| 5 | 0.41 | 0.49 | Citric acid | 3RD |
| 6.9 | 0.56 | 0.68 | KOH | 4TH |
| Water/cement ratio: | 0.20 | | | |
| Mixing Time: | | 22 min. | 3 day | 4,875 p.s.i. |
| Transport Time: | | 0 min. | 4 day | 5,500 p.s.i. |
| Placement Time: | | 19 min. | 10 day | 5,563 p.s.i. |
| Total Work Time: | | 41 min. | | |

After the cementitious components were mixed, 990 grams of sand were added, then the last two components were mixed to complete the cement and make mortar.

This example is identical to Ex. 20, except the last two components were mixed in reverse order. The resulting placement time of Ex. 20 of 1 hour and 7 minutes was reduced to 19 minutes.

What is even more remarkable is when citric acid is the last component to be mixed, following only borax, the placement time is longer. But when citric acid is the last component to be mixed following only boric acid, the placement time is shorter.

EXAMPLE 28

(Mixing sequence 8)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 220 | 16.52 | | Warm water | 1ST |
| 20 | 1.50 | 1.96 | Borax | " |
| 900 | 67.57 | 88.07 | Fly ash | 2ND |
| 90 | 6.76 | 8.81 | P.C. III | " |
| 90 | 6.76 | | Ground silica | 3RD |
| | | | | STEP 2 |
| 5 | 0.38 | 0.49 | Citric acid | 4TH |
| 6.9 | 0.52 | 0.68 | KOH | 5TH |
| Water/cement ratio: | 0.20 | | | |
| Mixing Time: | 31 min. | | 2 day | 8,062 p.s.i. |
| Transport Time: | 0 min. | | 3 day | 8,188 p.s.i. |
| Placement Time: | | 15 sec. | 4 day | 8,675 p.s.i. |
| Total Work Time: | 31 min. | 15 sec. | | |

Ground silica was added after the cementitious components were mixed. At the same time, 810 grams of sand were added to also make mortar.

This example and Ex. 21 are identical formulations. Only the order of mixing the last two components were reversed to alter the placement time.

EXAMPLE 29

(Mixing sequence 8)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 220 | 16.52 | | Warm Water | 1ST |
| 20 | 1.50 | 1.96 | Borax | " |
| 900 | 67.57 | 88.07 | Fly ash | 2ND |
| 75 | 5.63 | 7.34 | P.C. III | " |
| 15 | 1.13 | 1.47 | P.C. I | " |
| 90 | 6.76 | | Ground silica | 3RD |
| | | | | STEP 2 |
| 5 | 0.38 | 0.49 | Citric acid | 4TH |
| 6.9 | 0.52 | 0.68 | KOH | 5TH |
| Water/cement ratio: | 0.20 | | | |
| Mixing Time: | 22 min. | | 2 day | 7,000 p.s.i. |
| Transport Time: | 0 min. | | 7 day | 9,150 p.s.i. |
| Placement Time: | 9 min. | | 82 day | 12,000 p.s.i. |
| Total Work Time: | 31 min. | | | |

When the ground silica was mixed, 810 grams of sand were added, to also make mortar.

This example is identical to Ex. 22, except the order of mixing the last two components are reversed.

Comparing this example to Ex. 28 demonstrates how precise the placement time can be tailored by altering the Type of portland cement used.

EXAMPLE 30

(Mixing sequence 8)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 250 | 18.28 | | Warm water | 1ST |
| 20 | 1.46 | 1.95 | Borax | " |
| 900 | 65.83 | 87.61 | Fly ash | 2ND |
| 90 | 6.58 | 8.76 | P.C. I | " |
| 90 | 6.58 | | Ground silica | 3RD |
| | | | | STEP 2 |
| 9 | 0.66 | 0.88 | Citric acid | 4TH |
| 8.25 | 0.60 | 0.80 | KOH | 5TH |
| Water/cement ratio: | 0.20 | | | |
| Mixing Time: | | 22 min. | | |
| Transport Time: | | 0 min. | 9 day | 9,000 p.s.i. |
| Placement Time: | | 50 min. | 14 day | 9,375 p.s.i. |
| Total Work Time: | 1 hr | 12 min. | 28 day | 10,750 p.s.i. |

When the ground silica was mixed, 990 grams of sand were added to also make mortar.

This example is identical to Ex. 24, only the mixing order of the last two components were reversed to alter the placement times.

EXAMPLE 31

(Mixing sequence 8)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 250 | 17.77 | | Warm water | 1ST |
| 20 | 1.42 | 1.87 | Borax | " |
| 900 | 63.95 | 84.33 | Fly ash | 2ND |
| 130 | 9.24 | 12.18 | P.C. I | " |
| 90 | 6.40 | | Ground silica | 3RD |
| | | | | STEP 2 |
| 9 | 0.64 | 0.84 | Citric acid | 4TH |
| 8.25 | 0.59 | 0.77 | KOH | 5TH |
| Water/cement ratio: | 0.23 | | | |
| Mixing Time: | | 22 min. | 5 day | 6,563 p.s.i. |
| Transport Time | | 0 min. | 7 day | 8,650 p.s.i. |
| Placement Time: | 2 hrs | 0 min. | 14 day | 9,438 p.s.i. |
| Total Work Time: | 2 hrs | 22 min. | 28 day | 10,250 p.s.i. |

When the ground silica was mixed, 990 grams of sand were added to make mortar.

This example is identical to Ex. 30, except the Type I portland cement was increased from 90 grams to 130 grams, and the placement time increased from 50 minutes to 2 hours.

EXAMPLE 32

(Mixing sequence 8)

A cement was formed, consisting of the following:

| GRAMS | % of GRAMS | % of CHEM. & CEMENTI- TIOUS | COM- PONENTS | ORDER MIXED |
|---|---|---|---|---|
| | | | | STEP 1 |
| 250 | 19.72 | | Water | 1ST |
| 13.5 | 1.07 | 1.33 | Borax | " |
| 900 | 71.18 | 88.72 | Fly ash | 2ND |
| 90 | 7.12 | 8.87 | P. C. III | " |
| | | | | STEP 2 |
| 4.5 | 0.35 | 0.44 | Citric acid | 3RD |
| 6.4 | 0.51 | 0.63 | KOH | 4TH |
| Water/cement ratio: | 0.25 | | | |

| Mixing Time: | 17 min. | 1 day | 4,750 p.s.i. |
| Transport Time | 0 min. | 3 day | 5,312 p.s.i. |
| Placement Time: | 15 min. | 7 day | 6,438 p.s.i. |
| Total Work Time: | 32 min | | |

A small percent of chemicals will provide high early strengths, but the amount of borax used would not suspend this cement more than approximately 24 hours.

EXAMPLE 33

(Mixing sequence 9)

STEP 1

Before this example was carried out the potassium hydroxide and citric acid were combined, in a dry form, and placed in a waterproof, but easy to destroy pouch. The material used for making the pouch could be included in mortar or concrete, as inert filler, without creating problems when the material hardens.

A cement was formed, consisting of the following:

| GRAMS | % of GRAMS | % of CHEM. & CEMENTITIOUS | COMPONENTS | ORDER MIXED |
|---|---|---|---|---|
| 250 | 17.81 | | Water | 1ST |
| 9 | 0.64 | 0.85 | Boric acid | " |
| 30 | 2.14 | 2.82 | Borax | " |
| 900 | 64.13 | 84.63 | Fly ash | 2ND |
| 45 | 3.21 | 4.23 | P. C. III | " |
| 45 | 3.21 | 4.23 | P. C. I | " |
| 90 | 6.41 | | Ground silica | 3RD |

Half of the partially made cement was poured into a plastic bag. The pouch containing citric acid and potassium hydroxide was placed on top and in the center of half of the partially completed cement. The balance of the partially completed cement was poured on top. The partially made cement coagulated.

STEP 2

After waiting one week the contents were removed from the plastic bag and put in a mixer. The blades of the mixer cut through the material destroying the pouch releasing the citric acid and potassium hydroxide, which together act as an extreme water reducer thereby, immediately liquefying the coagulated mix.

| 16.5 | 1.18 | 1.55 | KOH | 4TH |
| 18 | 1.28 | 1.69 | Citric acid | " |

After the cement was complete, 810 grams of sand were added and mixed 2 minutes to demonstrate that aggregates can be added after the cement is completely made.

| Water/cement ratio: | 0.24 | | 1 day | 6,400 p.s.i. |
| Mixing Time: | | 17 mins. | 3 day | 9,000 p.s.i. |
| Transport Time: | 168 hours | 0 mins. | 7 day | 12,000 p.s.i. |
| Placement Time: | | 33 mins. | 14 day | 12,250 p.s.i. |
| Total Work Time: | 168 hours | 50 mins. | 28 day | 13,000 p.s.i. |

It is important to note that while there is placement time lost by holding the cementitious components in suspension over night, there is little further loss in placement time by holding the material a week, provided sufficient borax and/or boric acid has been used.

This example demonstrates how the cement of the present invention would be used to make concrete, mortar or neat cement under the following conditions:
1. the people making the concrete or mortar do not have the necessary equipment, skills, or time to measure the water properly,
2. time is of essence,
3. it is difficult to transport water to where the materials will be used,
4. there are already aggregates at the location where the concrete or mortar will be made,
5. a mistake free method must be assured, and,
6. where the neat cement would be extruded into structural building components or products that would instantly take set.

Item 6, above would be achieved by using a formulation that would lose its placement time in seconds, and sand, that would abrade equipment, would not be used.

EXAMPLE 34

(Mixing sequence 10)

STEP 1

Before this example was carried out the boric acid, potassium hydroxide, and citric acid to be used in step 2 were combined, in a dry form, and placed in a waterproof but easy to destroy pouch. The material used for making the pouch could be included in mortar or concrete, as inert filler, without creating problems when the material hardens.

A cement was formed, consisting of the following:

| GRAMS | % of GRAMS | % of CHEM. & CEMENTITIOUS | COMPONENTS | ORDER MIXED |
|---|---|---|---|---|
| 266 | 18.89 | | Warm water | 1ST |
| 20 | 1.42 | 1.90 | Borax | " |
| 900 | 63.90 | 85.51 | Fly ash | 2ND |
| 45 | 3.19 | 4.28 | P.C. III | " |
| 45 | 3.19 | 4.28 | P.C. I | " |
| 90 | 6.39 | | Ground silica | 3RD |

Half of the partially made cement was poured into a plastic pail. The pouch containing boric acid, potassium hydroxide, and citric acid was placed on top and in the middle of the partially completed cement. The remainder of the partially made cement was poured on top, which then coagulated.

STEP 2

The following day the pail of partially made cement containing the pouch was dumped into a mixer. The mixing blades cut through the material destroying the pouch releasing the boric acid, potassium hydroxide, and citric acid into the mix. While the citric acid combined with the potassium hydroxide acted as an extreme water reducer, the boric acid acted as an extreme modifying retarder, when mixed in step 2, instead of step 1.

| 8 | 0.57 | 0.76 | Boric acid | 4TH |
| 16.5 | 1.17 | 1.57 | KOH | " |
| 18 | 1.28 | 1.71 | Citric acid | " |

It was mixed five minutes, at which time 962.5 grams of sand were added to make mortar.

| | | | | |
|---|---|---|---|---|
| Water/cement ratio: | 0.25 | | 1 day | 6,250 p.s.i |
| Mixing Time: | | 17 min. | 3 day | 8,750 p.s.i. |
| Transport Time: | 13 hrs | 18 min. | 7 day | 11,150 p.s.i. |
| Placement Time: | 4 hrs | 37 min. | 14 day | 11,350 p.s.i. |
| Total Work Time: | 18 hrs | 12 min | 28 day | 12,700 p.s.i. |

This mixing sequence would be used where long transport time, long placement and finishing time is needed followed by very rapid high early strengths for general purposes, such as building highways.

In accordance with the present invention a process has been described for making a blended hydraulic cement, that can be used as a general purpose cement as well as for special applications. This cement can be used with sand to form mortar, or sand and gravel to form concrete. It has variable transporting times, followed by a selection of various placement times, and the resulting material made by this process hardens rapidly to provide high early and high ultimate strengths.

While the invention has been described and illustrated herein by references to various specific materials, procedures and examples, it is understood that the invention is not restricted to the particular materials, combination of materials, and procedures selected for that purpose. Numerous variations of such details can be employed, as will be appreciated by those skilled in the art.

What is claimed as new is:

1. A cement making process which comprises, (1) mixing:

from about 14.52 to 21.77 percent water, from about 0.10 to 1.25 percent boric acid set-suspending agent, from about 0.20 to 2.80 percent borax set-suspending agent, from about 0 to 8.00 percent ground silica, together with two or more hydraulic cementitious components selected from the group consisting of subbituminous class C fly ash, portland cement, and slag; with the total of said hydraulic cementitious components containing from about 77.00 percent to about 95.00 percent subbituminous class C fly ash; whereby the components in (1) provide the means to:

a. suspend the set of the hydraulic cementitious components, b. temper the hydraulic cementitious components, during the period of set-suspension, thereby creating an inorganic reactant, (2) activating at the time of placement said inorganic reactant by mixing with:

about 0.25 to 2.83 percent citric acid accelerator, and about 0.30 to 11.00 percent alkali metal activator, selected from the group consisting of: potassium hydroxide, potassium carbonate, sodium hydroxide, and sodium carbonate; and whereby the components in (2) provide the means to:

a. terminate the set-suspension of the cementitious components, b. create 3 different periods of time for placement following activation, by changing the order of introduction of components (2).

2. The cement making process according to claim 1 having the weight ratio of borax to boric acid of less than about 3:1, wherein:

a. the ponderable placement time is created by introducing the components in (2) into solution simultaneously, b. the shortest placement time is created by introducing the components in (2) separately, with said citric acid accelerator being the last component entered into solution, and c. the longest placement time is created by introducing the components in (2) separately, with said alkali metal activator being the last component entered into solution.

3. The cement making process according to claim 1 wherein sand is included to make mortar, or sand and coarse aggregates are included to make concrete.

4. A cement making process which comprises, (1) mixing from about 14.52 to 21.77 percent water, from about 0.20 to 2.80 percent borax set-suspending agent, from about 0 to 8.00 percent ground silica, together with two or more hydraulic cementitious components selected from the group consisting of subbituminous class C fly ash, portland cement, and slag; with the total of said hydraulic cementitious components containing from about 77.00 percent to about 95.00 percent subbituminous class C fly ash; and whereby the components in (1) provide the means to:

a. suspend the set of the hydraulic cementitious components, b. temper the hydraulic cementitious components, during the period of set-suspension, thereby creating an inorganic reactant, (2) activating at the time of placement said inorganic reactant by mixing with:

about 0.10 to 1.25 percent boric acid modifying retarder, about 0.25 to 2.83 percent citric acid accelerator, about 0.30 to 11.00 percent alkali metal activator, selected from the group consisting of: potassium hydroxide, potassium carbonate, sodium hydroxide, and sodium carbonate; and whereby the components in (2) provide the means to:

a. terminate the set-suspension of the cementitious components, b. create 3 different periods of time for placement following activation, by changing the order of introduction of components in (2).

5. The cement making process according to claim 4 having the weight ratio of borax to boric acid of less than about 3:1, wherein:

a. the ponderable placement time is created by introducing the components in (2) into solution simultaneously, b. the shortest placement time is created by introducing the components in (2) separately, with said citric acid accelerator being the last component entered into solution, and c. the longest placement time is created by introducing the components in (2) separately, with said alkali metal activator being the last component entered into solution.

6. The cement making process according to claim 4 wherein sand is included to make mortar or, sand and coarse aggregates are included to make concrete.

7. The cement making process according to claim 4 whereby means is provided for eliminating the need for measuring and adding water to rapid-setting cement, at time of placement, by:

a. first placing the activating components to be mixed in (2), in a waterproof easy to destroy pouch, made of material that can be included in mortar or concrete without creating strength or durability problems, b. encapsulating the pouch inside of said inorganic reactant in (1), as it is poured into a sealable container, c. allowing the inorganic reactant time to harden into a coagulated mass, d. at time of placement removing said coagulated mass from the container and placing in a mixer, e. mixing said mass for a time sufficient to rupture or break the encapsulated pouch thus, releasing the (2) components into the mix of the inorganic reactant.

8. The cement making process according to claim 4 wherein said boric acid modifying retarder in (2) is used in place of said borax suspending agent in (1), and wherein the borax suspending agent in (1) is used in place of the boric acid modifying retarder in (2).

9. A cement making process which comprises, (1) mixing:

from about 14.52 to 21.77 percent water, from about 0.12 to 1.35 percent boric acid suspending agent, from about 0 to 7.99 percent ground silica, together with two or more hydraulic cementitious components selected from the group consisting of subbituminous class C fly ash, portland cement, and slag; with the total of said hydraulic cementitious components containing from about 77.03 percent to about 95.00 percent subbituminous class C fly ash; and whereby the components in (1) provide the means a. suspend the set of the said hydraulic cementitious components, b. temper the hydraulic cementitious components, during the period of set-suspension, thereby creating an inorganic reactant, (2) activating at the time of placement said inorganic reactant by mixing with:

about 0.25 to 2.83 percent citric acid accelerator, and about 0.30 to 11.00 percent alkali metal activator, selected from the group consisting of: potassium hydroxide, potassium carbonate, sodium hydroxide, and sodium hydroxide; and whereby the components in (2) provide the means to:

a. terminate the set-suspension of the cementitious components, b. create 3 different periods of time for placement following activation, by changing the order of introduction of components in (2), wherein:

(i) the ponderable placement time is created by introducing the components in (2) into solution simultaneously, (ii) the shortest placement time is created by introducing the components in (2) separately with said citric acid accelerator being the last component entered into solution, and (iii) the longest placement time is created by introducing the components in (2) separately with said alkali metal activator being the last component entered into solution.

10. The cement making process according to claim 9 wherein sand is included to make mortar or, sand and coarse aggregates are included to make concrete.

11. A cement making process which comprises, (1) mixing:

from about 14.52 to 21.77 percent water, from about 0.24 to 2.95 percent borax set-suspending agent, from about 0 to 7.98 percent ground silica, together with two or more hydraulic cementitious components selected from the group consisting of subbituminous class C fly ash, portland cement, and slag; with the total of said hydraulic cementitious components containing from about 77.03 percent to about 95.00 percent subbituminous class C fly ash; and whereby the components in (1) provide the means to:

a. suspend the set of the said hydraulic cementitious components, b. temper the hydraulic cementitious components, during the period of set-suspension, thereby creating an inorganic reactant, (2) activating at the time of placement said inorganic reactant by mixing with:

about 0.25 to 2.83 percent citric acid accelerator, and about 0.30 to 1.00 percent alkali metal activator, selected from the group consisting of: potassium hydroxide, potassium carbonate, sodium hydroxide, and sodium carbonate; and whereby the components in (2) provide the means to:

a. terminate the set-suspension of the cementitious components, b. create 3 different periods of time for placement following activation, by changing the order of introduction of components in (2), wherein:

(i) the ponderable placement time is created by introducing the components in (2) into solution simultaneously, (ii) the shortest placement time is created by introducing the components in (2) separately with said alkali metal activator being the last component entered into solution, and (iii) the longest placement time is created by introducing the components separately with said citric acid accelerator being the last component entered into solution.

12. The cement making process according to claim 11 wherein sand is included to make mortar or, sand and coarse aggregates are included to make concrete.

13. The cement making process according to claim 1 having a weight ratio of borax to boric acid of about 3:1 or greater, wherein:

a. the ponderable placement time is created by introducing the components in (2) into solution simultaneously, b. the shortest placement time is created by introducing the components in (2) separately, with said alkali metal activator being the last component entered into solution, and c. the longest placement time is created by introducing the components in (2) separately, with said citric acid accelerator being the last component entered into solution.

14. The cement making process according to claim 4 having a weight ratio of borax to boric acid of about 3:1 or greater, wherein:

a. the ponderable placement time is created by introducing the components in (2) into solution simultaneously, b. the shortest placement time is created by introducing the components in (2) separately, with said alkali metal activator being the last component entered into solution, and c. the longest placement time is created by introducing the components in (2) separately, with said citric acid accelerator being the last component entered into solution.

* * * * *